United States Patent
Porter et al.

(10) Patent No.: US 6,205,798 B1
(45) Date of Patent: Mar. 27, 2001

(54) TEST FOR THE AUTOMATED DETECTION OF LEAKS BETWEEN HIGH AND LOW PRESSURE SIDES OF A REFRIGERATION SYSTEM

(75) Inventors: Kevin J. Porter, Syracuse; Garret J. Malone, E. Syracuse; Thomas J. Dobmeier, Balwinsville; Peter H. Kopp, Syracuse; Mark R. Rabbia, Brewerton, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/233,770

(22) Filed: Jan. 19, 1999

(51) Int. Cl.$^7$ .................................................. F25B 49/02
(52) U.S. Cl. ................................................ 62/129; 62/131
(58) Field of Search ............................. 62/125, 126, 127, 62/129, 158, 131; 165/11.1, 11.2

(56) References Cited

U.S. PATENT DOCUMENTS

| | | | |
|---|---|---|---|
| 5,140,825 | | 8/1992 | Hanson et al. ................. 62/127 X |
| 5,172,561 | | 12/1992 | Hanson et al. .................. 62/127 |
| 5,186,014 | * | 2/1993 | Runk .............................. 62/129 |
| 5,649,429 | * | 7/1997 | Schreber ..................... 62/126 X |
| 5,983,657 | * | 11/1999 | Murata et al. ................ 62/129 X |

* cited by examiner

*Primary Examiner*—Harry B. Tanner
(74) *Attorney, Agent, or Firm*—Wall Marjama & Bilinski

(57) ABSTRACT

A method for the automated detection of leaks between the high and low-pressure sides of a refrigeration system is provided. A large pressure difference is created between the high pressure side and low-pressure side. By measuring and comparing system pressures at different times, the operational condition of valves which connect the high pressure side to the low-pressure side is accurately determined. By accurately determining that these valves are operating correctly, and in particular that no leaks exist in the valves, reports of false failures are prevented, while the reduction in the refrigeration system's capacity to heat or cool is prevented.

12 Claims, 7 Drawing Sheets

TEST FOR THE AUTOMATED DETECTION OF LEAKS BETWEEN HIGH AND LOW PRESSURE SIDES OF A REFRIGERATION SYSTEM

FIELD OF THE INVENTION

The present invention relates generally to the field of refrigeration systems for heating and cooling in a controlled environment. In particular, the invention relates to an algorithm for automatically determining whether there are leaks between the high and low-pressure sides of the refrigeration system.

BACKGROUND OF THE INVENTION

Refrigeration systems are used in many applications for heating and cooling a controlled environment, including homes, buildings and cargo boxes of transport trucks, trains, ships or planes. Before operating a refrigeration system in a cooling or heat/defrost mode, it is desirable to determine whether the refrigeration system 102, is in an operational condition. To determine if the refrigeration system is functioning properly, a diagnostic "pretrip" routine is run to ensure proper operation. Pretrip is a process of testing a refrigeration system before operating the system in a cooling or heat/defrost mode to ensure that the system will operate properly.

To date there have been few attempts to create pretrip testing methods, and those proposed pretrip routines have been inadequate for a variety of reasons. For example, U.S. Pat. No. 5,172,561, discloses a pretrip operational method for automatically checking predetermined functions and the operating performance of a transport refrigeration unit. This system measures the current draw from predetermined electrical components with a prime mover stationary, and compares the measured current draw of those components with an allowable range for the component. When a control unit in the comparison step finds that the current draw for each component checked is in the associated allowable range, the actual speed of the internal combustion engine is determined, and compared to the actual speed of the internal combustion engine to determine if it is in an allowable range. This pretrip method employs temperature sensors which sense the temperatures of the return air, discharge air and ambient air. The system is then commanded to operate in a cooling mode, and the unit is checked for adequate cooling capacity as a function of the temperature values of the return air, discharge air, and ambient air. It is then determined if the transport refrigeration system is operating in the commanded heating mode by comparing the temperatures of the return air and discharge air. Operation of the modulation valve is determined by sensing the speed of the prime mover before and after closing of the modulation valve.

Although this pretrip method attempts to verify whether the system will operate correctly, it suffers from numerous defects. For example, one disadvantage is that the pretrip routine executed is the same regardless of the desired box temperature or ambient temperature. This creates numerous problems especially when heating in warm ambients or cooling in cool ambients. Another limitation of the related art pretrip methods is that they failed to determine the causes of specific problems within the refrigeration system, and even assuming they could determine the cause of the problem, these related art pretrip methods could not determine if problem resulted from the failure of a particular component of the system. Yet another disadvantage of these pretrip routines they only evaluate a change in temperature to determine whether the refrigeration system will function properly. Thus, the related art pretrip methods failed to evaluate whether the system is maintaining necessary pressures at certain points in the system. As a result, alarms in the system would often sound when they were not supposed to (i.e., false failures), or conversely not sound when there were actual problems in the system. Either of these problems is very undesirable. For example, false alarms cause the refrigeration system to be taken out of service and inspected for problems, which takes time and costs money. In addition, a false alarm takes even longer to service because there are no identifiable problems. Furthermore, failing to sound an alarm when there are actual problems in the system often results in destruction of the cargo.

SUMMARY OF THE INVENTION

Therefore, it is an object of the present invention to overcome the limitations of the prior art.

It is an object of the present invention to improve performance and reliability of the refrigeration system by detecting leaks in valves.

It is a further object of the present invention to signal an alarm when there is a leak between a high-pressure side and a low-pressure side of the refrigeration system.

It is yet a further object of the present invention to alert the user of potential problems with a refrigeration system before they adversely affect system performance.

Another object of the present invention is to determine which valves are faulty from many valves in the system. The valves connect the high-pressure side to the low-pressure side.

It is a further object of the present invention to enhance the refrigeration system's ability to heat or cool by maximizing the efficiency of the system.

It is a further object of the present invention to prevent unnecessary shut down of the system by detecting leaks before the system is operational and detrimentally relied upon.

Another object of the present invention is to ensure correct operation by picking up actual problems with the system, and to prevent false failures (i.e., false alarms) of the refrigeration system.

According to the present invention a method of checking for leaks between a high-pressure side and low-pressure side of a refrigeration unit is provided. This method includes the steps of decreasing the suction pressure in the low pressure side, increasing a discharge pressure in a high pressure side of the refrigeration unit, and then checking for leaks between said low pressure side and said high pressure side.

The steps of decreasing the suction pressure in the low pressure side, and increasing a discharge pressure in a high pressure side of the refrigeration unit may be accomplished by pumping down a pressure in the low pressure side, opening a valve, and then verifying that the valve opened.

The system is pumped down by continuously removing refrigerant from the low-pressure side until said low-pressure side reaches a first predetermined pressure.

The preferred method of verifying that the valve is operational is by observing significant changes in suction (low) pressure and discharge (high) pressure during opening of the valve.

In one embodiment of the invention, leaks are checked for by turning off a compressor, simultaneously closing any opened valve, waiting momentarily, and then checking for an increase in the suction pressure beyond a specified limit.

In an alternate form of the invention suction pressure may be decreased while discharge pressure may be increased by closing a first valve, decreasing the suction pressure to a first pressure by increasing the discharge pressure, opening the first valve, waiting, and determining if there are any changes in the suction pressure. The process is then repeated by closing the first valve, and decreasing the suction pressure to a predetermined pressure. This also increases the discharge pressure. The process continues by opening a second valve and determining whether the suction pressure or discharge pressure changes. Next, the process continues by further decreasing the suction pressure to an even lower predetermined pressure.

BRIEF DESCRIPTION OF THE DRAWINGS

These and other features of the invention, as well as additional objects, advantages, and other novel features of the invention, will become apparent to those skilled in the art upon reading the following detailed description and accompanying drawings.

DETAILED DESCRIPTION OF THE INVENTION

Figure 1:
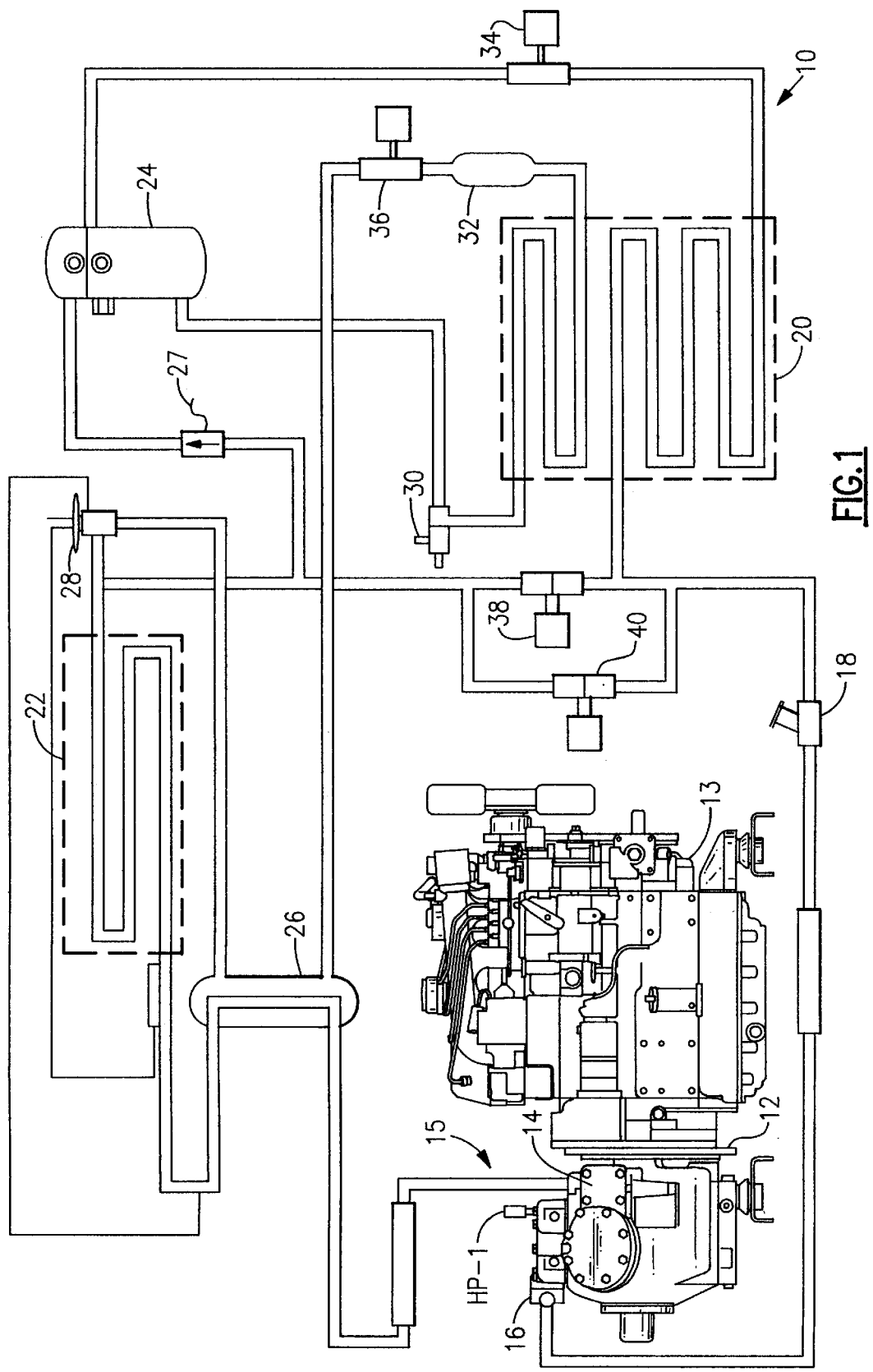
FIG. 1, is a schematic diagram of a refrigeration system.

One particular example of a refrigeration system in which the present invention may be employed is shown in FIG. 1. Refrigeration system 10 includes a compressor 12 driven by an engine 13, a suction service valve 14, a discharge service valve 16, a discharge check valve 18, an air cooled condenser 20 which includes a subcooler portion, an evaporator 22, a receiver 24, a heat exchanger 26, a bypass check valve 27, an expansion valve 28, a manual receiver shutoff valve 30, a filter drier 32, a plurality of valves 34, 36, 38, 40 (typically provided by solenoid valves), a front and rear unloader (not shown), a speed control solenoid 45 (FIG. 2), and an evaporator fan clutch (not shown). Compressor 12 includes a discharge or "high" side 15 and a suction, or "low" side 17. By convention, components of system 10 located toward high side 15 including discharge check valve 18 and condenser 20 are termed "high side" system components whereas system components located toward low side 15 including evaporator 22 and expansion valve 28 are termed "low side" system components. Furthermore, the region of system 10 between discharge side 15 and condenser 20 is conveniently referred to as the "high side" or "high pressure side" of system 10, while the region of system between condenser 20 and suction side 17 is conveniently referred to as the "low side" or "low pressure side" of system 10. Because valves 34–40 all operate to control the flow of refrigerant between high and low side system components, they are sometimes referred to herein as high to low side valves. The refrigeration system 10 operates in various modes, including a cooling mode and a heating/defrost mode. In the cooling mode, the refrigeration system 10 removes heat from a work space. In the heating mode, the refrigeration system 10 adds heat to the work space. In the defrosting mode, the refrigeration system adds energy to the evaporator, where the evaporator fan clutch is off, thus defrosting the evaporator.

Preliminarily, note that any known refrigerant may be used in the system, and that all references made to gas or liquid herein are actually referring to the state of the refrigerant at different places during operation. Generally, the purpose of the refrigerant is to pick up heat by evaporating at low pressure and temperature, and to give up heat by condensing at high temperature and pressure. For instance, by manipulating the pressure of the refrigerant to appropriate levels, the same refrigerant can evaporate at 40 degrees F. and condense at 120 degrees F. By evaporating at a low temperature, heat will flow from the work space into the refrigerant within the direct expansion evaporator 22. Conversely, the refrigerant rejects heat when it condenses from a gas into a liquid. This process is explained in greater detail below.

Operation of the refrigeration system 10 in a cooling mode of operation or a cooling cycle is as follows. In general, during the cooling cycle the evaporator 22 draws heat from the work space being cooled, whereas the condenser 20 is used to reject heat from the high pressure gas to the external environment.

To initiate a cooling cycle, a reciprocating compressor 12 receives low pressure refrigerant in the form of super-heated gas through a suction service valve 14 and compresses the gas to produce a high-pressure, super-heated gas. By reducing the volume of the gas, the compressor 12 establishes a high saturation temperature which enables heat to flow out of the condenser. The high pressure gas is discharged from the compressor 12 through a discharge service valve 16 and flows through a discharge check valve 18 into the condenser 20.

Next, a fan in the condenser 20 circulates surrounding air over the outside of condenser tubes comprising the coil. This coil is where the condensation takes place, and heat is transferred from the refrigerant gas to the air. By cooling the gas as it passes through the condenser 20, the removal of heat causes the gas to change state into a high-pressure saturated liquid. The refrigerant leaves the condenser as a high-pressure saturated liquid, and flows through valve 34, conveniently referred to as "condenser valve", into the receiver 24. As is shown in FIG. 1, valves 38 and 40, conveniently referred to as "hot gas valves", are closed thereby keeping the discharged gas from entering into a direct expansion evaporator 22.

From the air-cooled condenser 20, the high-pressure liquid then passes through open condenser valve 34 (sometimes referred to herein as condenser pressure control valve 34) and into a receiver 24. The receiver 24 stores the additional charge necessary for low ambient operation in a heating mode. The receiver 24 is equipped with a fusible plug which melts if the refrigerant temperature is abnormally high and releases the refrigerant charge. At the receiver 24, any gas remaining in the high-pressure liquid is separated and the liquid refrigerant then passes back through the manual receiver shutoff valve 30 (king valve) and into a subcooler section of the condenser 20 where it is subcooled. The subcooler occupies a portion of the main condensing coil surface and gives off further heat to the passing air. After being subcooled the liquid then flows through the filter-drier 32 where an absorbent keeps the refrigerant clean and dry. The high-pressure liquid then passes through the electrically controlled valve 36, conveniently referred to as "liquid line valve", which starts or stops the flow of refrigerant. In addition, the high-pressure liquid may flow to a heat exchanger 26. If so, the liquid is cooled even further by giving off some of its heat to the suction gas.

Next, the cooled liquid emerging from the heat exchanger 26 passes through an externally equalized thermostatic expansion valve 28. As the liquid is metered through the valve 28, the pressure of the liquid drops, thus allowing maximum use of the evaporator heat transfer surface. More specifically, this expansion valve 28 takes the subcooled liquid, and drops the pressure and temperature of the liquid to regulate flow to the direct expansion evaporator 22. This results in a low pressure saturated liquid/gas mixture.

After passing through the expansion valve 28, the liquid enters the direct expansion evaporator 22 and draws heat from the work space being cooled. The low pressure, low temperature fluid that flows into the evaporator tubes is colder than the air that is circulated over the evaporator tubes by the evaporator fan. As a result, heat is removed from the air circulated over the evaporator 22. That is, heat from the work space is transferred to the low pressure liquid thereby causing the liquid to vaporize into a low-pressure gas, thus, and the heat content of the air flowing over the evaporator 22 is reduced. Thus, the work space experiences a net cooling effect, as colder air is circulated throughout the work space to maintain the desired temperature. Optionally, the low-pressure gas may pass through the "suction line/liquid line" heat exchanger 26 where it absorbs even more heat from the high pressure/high temperature liquid and then returns to the compressor 12.

After passing through the heat exchanger 26, the gas enters the compressor 12 through the suction service valve 14 where the process repeats itself. That is, the air cooled by the evaporator 22 is sent directly to the air conditioned work space to absorb more heat and to bring it back to the coil for further cooling.

The refrigeration system of the present invention may also be used to heat the work space or defrost the evaporator 22. During the heating/defrost cycle, a low pressure vapor is compressed into a high pressure vapor, by transferring mechanical energy from a reciprocating compressor 12 to the gas refrigerant as it is being compressed. This energy is referred to as the "heat of compression", and is used as the source of heat during the heating/defrost cycle. This refrigeration system is known as a "hot gas heat" type refrigeration system since the hot gas from the compressor is used as the heat source for the evaporator. By contrast, the present invention could also be employed with heat pumps wherein the cycle is reversed such that the heat normally rejected to the ambient air is rejected into the work space. The heating/defrost cycle will now be described in detail.

In the heating/defrost cycle, the reciprocating compressor 12 receives low pressure and low temperature gas through the suction service valve 14 and compresses the gas to produce a high pressure gas. The high temperature, high pressure gas is discharged from the compressor 12 through the discharge service valve 16. The hot gas valve 38 and the condenser pressure valve 34 are closed to prevent refrigerant from flowing through them. This closes off the condenser 20 so that once the condenser coils are substantially filled with refrigerant, the majority of the refrigerant will then flow through the discharge check valve 18 and the hot gas valve 40. The hot gas from the compressor 12 then flows into the evaporator 22, effectively transferring energy from the compressor to the evaporator and then to the work space.

A processor 100 opens valve 36 when the compressor discharge pressure falls to cut-in settings, allowing refrigerant from the receiver to enter the evaporator 22 through the expansion valve 28. The hot vapor flowing through valve 40 forces the liquid from the receiver 24 via a bypass check line and a bypass check valve 27. By opening valve 36 and closing valve 34, the refrigerant liquid is allowed to fill up and build up head pressure, equivalent to discharge pressure, in the condenser 20. Opening valve 36 also allows additional refrigerant to be metered through the expansion valve 28 so that it eventually is disposed in the condenser 20. The increase of the refrigerant in the condenser 20 causes the discharge pressure to rise, thereby increasing the heating capacity of the refrigeration system 10. This allows the compressor 12 to raise its suction pressure, which allows the refrigeration system 10 to heat. Liquid line valve 36 will remain open until the compressor discharge pressure increases to cut-out setting, at which point a processor 100 closes (shown in FIG. 2) solenoid valve 36. This stops the flow of refrigerant in the receiver 24 to the expansion valve 28. Significantly, valve 36 may be closed only after the compressor 12 is discharging at a cut-out pressure. Thus, via the evaporator 22, the high pressure refrigerant gas gives off heat to the work space, lowering the temperature of the refrigerant gas. The refrigerant gas then leaves the evaporator 22 and flows back to the compressor 12 through the suction service valve 14.

In a preferred embodiment, the hot gas valve 38 is closed if the ambient temperature is above a first predetermined temperature. If after a 60 second delay the engine remains in high speed, and the difference between ambient and discharge temperatures exceeds a pre-determined temperature differential, then valve 38 opens. On the other hand, if the difference between ambient and discharge temperatures goes below a second pre-determined temperature differential, then valve 38 closes. When in engine operation and the discharge pressure exceeds predetermined pressure settings, pressure cutout switch (HP-1) opens to de-energize the run relay coil and stop the engine.

Figure 2:
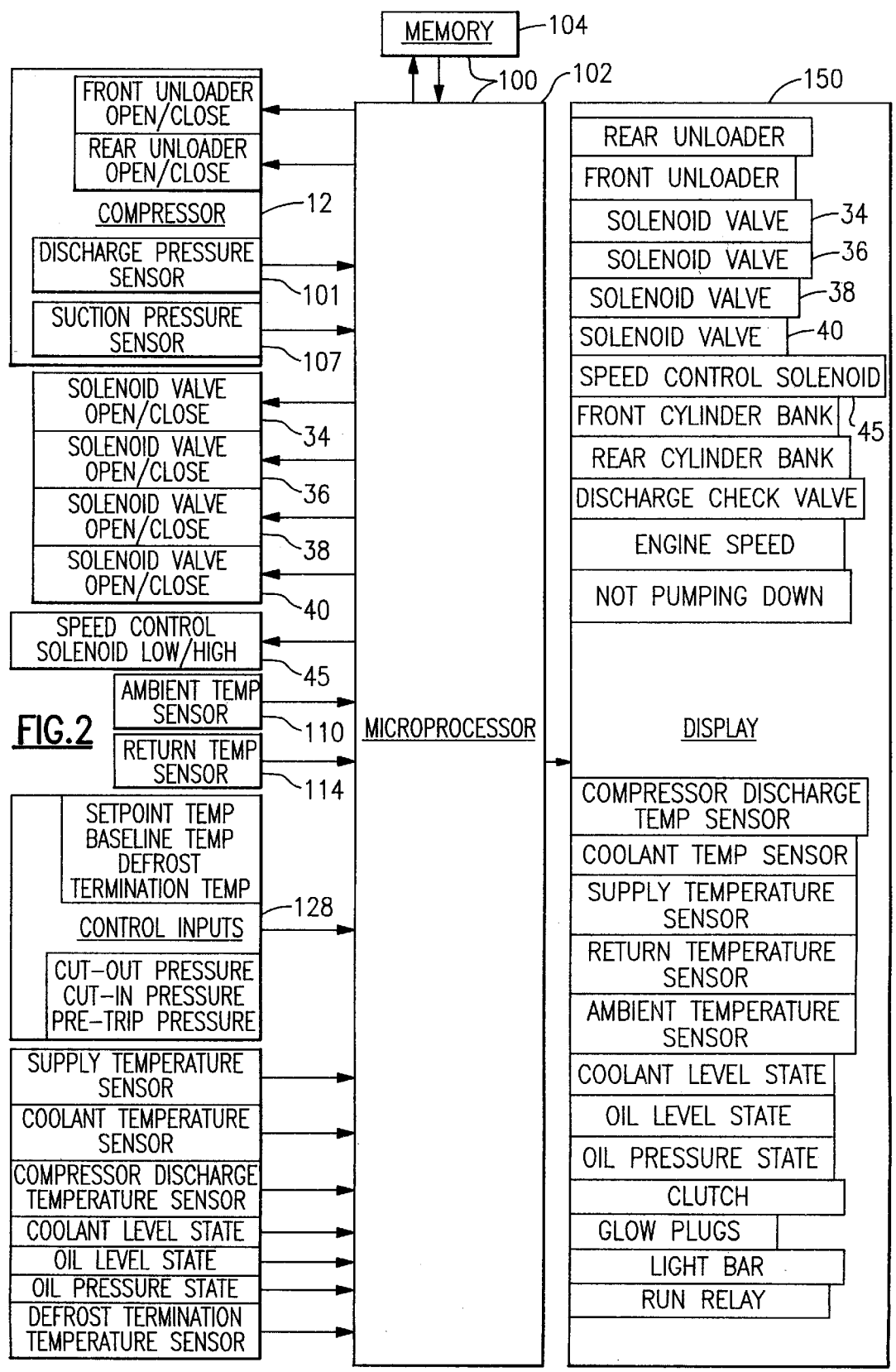
FIG. 2, is a block diagram showing a processor for interfacing with various components of the refrigeration system.

Turning to FIG. 2, the refrigeration system 10 is electronically controlled by a control unit shown as being provided by a processor 100, including a microprocessor 102 and an associated memory 104. The processor 100 is connected to a display 150 which displays various parameters and also various fault alarms that exist within the refrigeration system 10.

When the refrigeration system 10 is in an operating mode to control the temperature of a work space, the processor 100 receives several inputs including an ambient temperature from an ambient temperature sensor 110, a setpoint temperature, a return temperature from a return temperature sensor 114, a baseline temperature, a suction pressure from a suction pressure transducer 107, a discharge pressure from a discharge pressure transducer 101, a cut-out pressure, a cut-in pressure and a pretrip pressure. The ambient temperature is received by the processor 100 through the ambient temperature sensor 110 on the exterior of the work space. The setpoint temperature is input to the processor 100 through an input control device 128 and is typically the desired temperature of the work space. The return temperature is the actual temperature of the work space and is received by the processor 100 through the return temperature sensor 114 located within the work space. The baseline temperature is input to the processor 100 through the input control device 128 and will be discussed later.

In addition, there are several other inputs to the processor 100 including a supply temperature, a coolant temperature, a compressor discharge temperature, a coolant level state, an oil level state, an oil pressure state, and a defrost termination temperature.

The suction pressure, sensed by the suction pressure transducer 107, is the pressure of the refrigerant vapor at the low side of the compressor 12 as it is being drawn into the compressor through the suction service valve 14. The suction pressure transducer 107 is disposed in a position to monitor the pressure through the suction service valve 14 and the suction pressure value is input to the processor 100, where the processor 100 uses the value or stores the value for later use.

The discharge pressure, sensed by the discharge pressure transducer 101, is the pressure at the high side of the compressor 12. This is the pressure of the refrigerant vapor as it is being discharged from the compressor 12 through the discharge service valve 16. The discharge pressure is monitored by a pressure transducer 101 disposed in a position to monitor the pressure through the discharge service valve 16 and the discharge pressure value is input to the processor 100, where the processor 100 uses the value or stores the value for later use.

At certain times during operation of refrigeration system 10 in an operational mode, such as a cooling, a heat/defrost mode, or a pretrip mode, it may be necessary to control an input to a system component based on a pressure differential indicator which indicates a pressure differential between different points in a refrigeration system such as between a high side and a low side of compressor 12. Because discharge pressure, suction pressure, and pressure differential normally predictably depend on one another, this pressure differential indicator can in general, be provided by any one of a discharge pressure reading, a suction pressure reading or pressure differential such as (discharge pressure minus suction pressure) reading or by a combination of such readings. Furthermore, because pressure is related to temperature, a pressure differential indicator can also normally be provided by a discharge temperature reading, a suction temperature reading, or temperature differential such as (discharge temperature minus suction air temperature) reading or by a combination of such readings. Under certain circumstances, however, such as where the refrigerant is subjected to temperature sensing in a vapor-only phase, a temperature transducer may not provide as reliable an indicator as pressure as a pressure transducer.

The cut-out pressure, cut-in pressure and pretrip pressure are user selected pressure values that are input to the processor 100 through the input control device 128 and will be discussed below.

The processor 100 determines whether to operate refrigeration system 10 in a cooling mode or heating mode by comparing the setpoint temperature to the supply and/or return temperature. If the setpoint temperature is less than the return temperature, then processor 100 operates the refrigeration system 10 in a cooling mode. If the setpoint temperature is greater than the return temperature, then processor 100 operates refrigeration system 10 in a heating mode.

In the cooling mode, the processor 100 opens and closes high-to-low side valves 34–40 according to a required protocol as described previously herein in connection with FIG. 1. In particular, the processor 100 opens valves 34 and 36 and closes valves 38 and 40, which forces the refrigerant to flow from the compressor 12 to the condenser 20, through the condenser 20 and to the receiver 24, through the receiver 24 and back to the condenser 20, through the condenser 20 and to the heat exchanger 26, through the heat exchanger 26 and through the expansion valve 28 and then to the evaporator 22, through the evaporator 22 and back through the heat exchanger 26, and then back to the compressor 12. The details of the cooling mode have been discussed above.

In the heating mode, the processor 100 opens and closes high-to-low side valves 34–40 according to a required protocol and as described previously according to FIG. 1. In particular, the processor 100 closes condenser valve 34 and opens hot gas valve 40, which causes the condenser 20 to fill with refrigerant, and forces the hot gas from the compressor 12 into the evaporator 22. The liquid line valve 36 remains open until the discharge pressure reaches the cut-out pressure, at which point the processor 100 de-energizes and closes the liquid line valve 36 thereby stopping the flow of refrigerant into the expansion valve 28. When the compressor discharge pressure falls to the cut-in pressure, the processor 100 in turn energizes the closed liquid line valve 36 which opens, allowing refrigerant from the receiver 24 to enter the evaporator 22 through the expansion valve 28. Typically, in the heating mode, valve 38 remains closed until the compressor discharge temperature rises by a predetermined amount at which point valve 38 opens. The details of the heating mode have been discussed above. From time to time, the refrigeration system 10 will be caused to cease operating in a cooling or heating/defrost mode. For example, refrigeration system 10 is employed to control the air temperature of a tractor trailer work space (known as a "box") it is typical to take the refrigeration system 10 out of a cooling or heating/defrost mode when a door of the trailer is opened for loading or unloading goods from the box. Before starting up the refrigeration system 10, or restarting the system 10 after a temporary shutdown, it is sometimes desirable to have the processor 100 execute a routine in order to determine the operational condition of various components of the refrigeration system 10. Because such a routine is useful in determining component problems which may cause the refrigeration system 10 to malfunction when placed on-line (that is, caused to operate in a cooling or heat/defrost mode), such a routine may be referred to as a "pretrip" routine.

Preferably, the pre-trip routine comprises several tests for determining the mechanical operation of each of several system components such as high-to-low side valves 34, 36, 38, 40, the discharge check valve 18, a front unloader, a rear unloader, a front cylinder bank and a rear cylinder bank (not shown) of the compressor 12.

Now referring to particular aspects of the present invention, the present invention relates specifically to a method for testing for leaks between the high-pressure side and low-pressure side of a refrigeration system. The leak test method is conveniently implemented as part of a pretrip routine. In refrigeration systems, refrigerant leaks adversely affect the performance of the system by reducing the overall reliability and performance of the unit. It is desirable to prevent leaks since high energy vapor migrating from the high-pressure side (condenser) to the low-pressure side (evaporator) reduces the systems' ability to heat or cool. For instance, refrigerant leaks in the hot gas solenoid valves 38 and 40 or the bypass check valve adversely affect cooling performance, while a leak in liquid solenoid valve 36 during heating may result in an excessive discharge pressure and "shut-down" of the unit. Thus, automated detection of these leaks would allow the system to maintain maximum efficiency and experience fewer shutdowns. In a preferred embodiment, this test method of the present invention in addition to checking for leaks, checks to ensure that the high-to-low side valves 34–40 will open and close properly.

Preliminary, note that during the entire time this algorithm is being implemented, a discharge pressure control algorithm should be activated to maintain discharge pressure to ensure that the high-side pressure limit is not exceeded during pump down. A method for controlling discharge pressure is described in detail in copending application Ser. No. (09/233,755), entitled "Control Algorithm for Maintaining Discharge Pressure in a Refrigeration System", assigned to the assignee of the present invention, filed concurrently herewith, and incorporated by reference herein, in its entirety. The high-to-low side leak test of the present invention is described with reference to FIG. 3. As indicated at block 200, to begin detection of high-to-low side leaks, the processor 100, by control over appropriate system components, increases a pressure difference between the high-pressure side (discharge) and low-pressure side (suction) of the system, which is sufficient to ensure that a significant amount of refrigerant does not remain in the low side of the system after the last pump down. Preferably, the step of increasing the pressure difference is accomplished by a process including the steps of closing all the systems high to low side valves 34–40, and operating the system at its lowest capacity so that the suction pressure decreases slowly and the discharge pressure increases slowly. This increased pressure difference eventually establishes the large pressure differential across the high to low side valves which is necessary to force an adequate amount of refrigerant through a leak. Low suction pressure also helps ensure that all refrigerant is removed from the evaporator until virtually no refrigerant remains. This ensures that any significant pressure changes in suction pressure after pump down, are attributable to leaks in the system, and not attributable to the evaporation of liquid refrigerant left in the evaporator.

Figure 3:
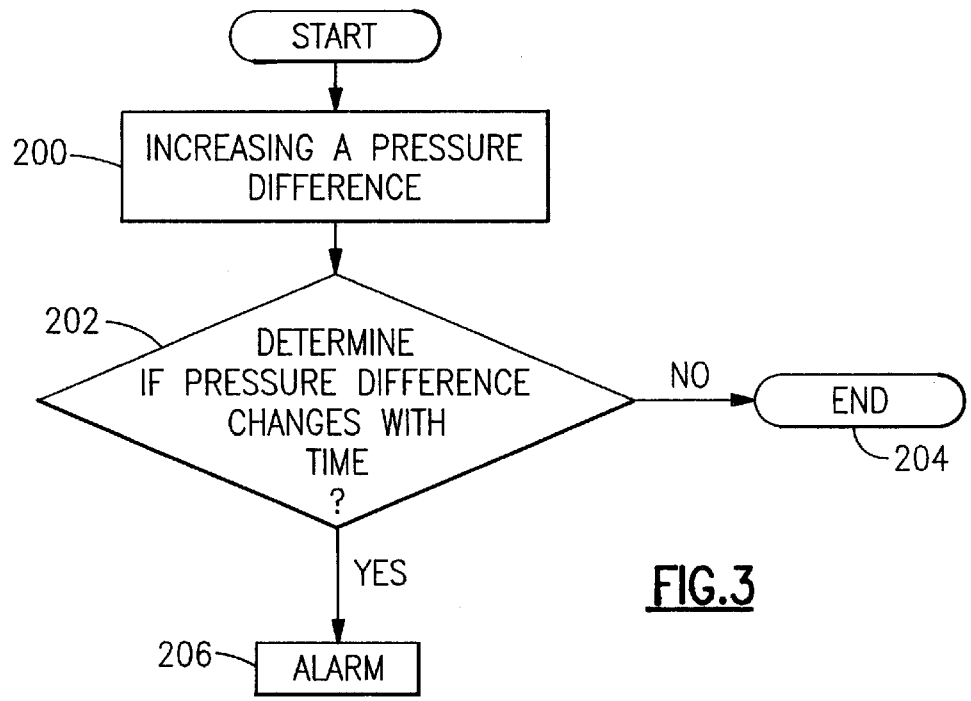
FIG. 3, is a functional block diagram of a first preferred embodiment of the present invention.

In a preferred embodiment, the processor 100 executes the step of "increasing the pressure difference", indicated at block 200 of FIG. 3 by implementation of three pump-down processes. A pump-down refers to the process of increasing a pressure differential between the high and low side of the system by closing all of the high-to-low side valves 34–40 to isolate the high side from the low side, while the compressor continues to run. During the three pump-down process, the processor 100 executes the steps of increasing the pressure differential between a high-pressure side and a low-pressure side of the system 10, while verifying opening/ closing operation of the high-to-low side valves 38 and 40 after the first and second pump-downs, respectively. A first pump-down and valve operation test is described with reference to the flow diagrams of FIGS. 4(a) and 4(b), while a second pump-down and valve operation test will be described with reference to the flow diagrams of FIGS. 5(a) and 5(b). Note that the order in which these tests are performed is arbitrary, but for purposes of description the method of pumping down and checking high-to-low side valve 40 will be described first, followed by a discussion of the method of pumping down and checking high-to-low side valve 38.

Figure 4A:
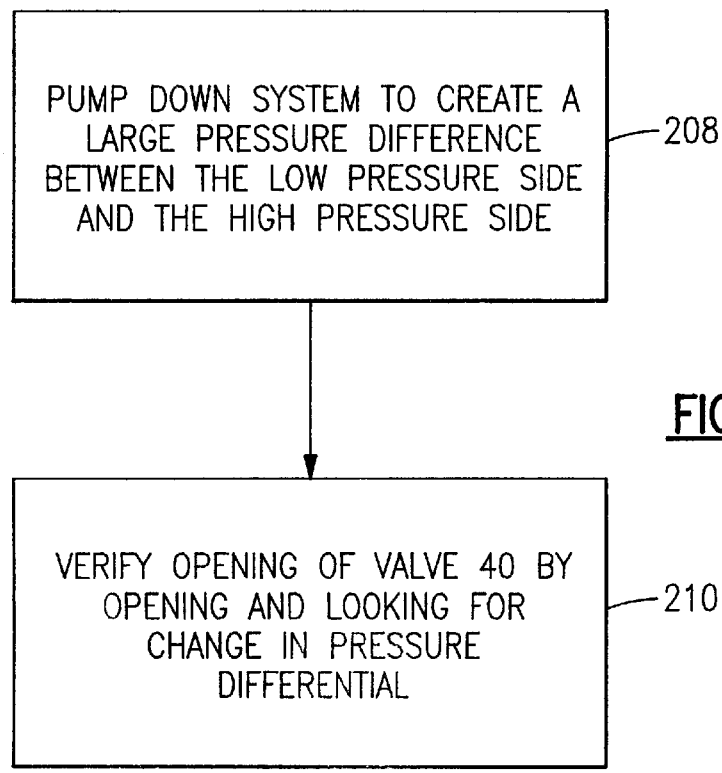
FIGS. 4(a) and 4(b), are functional block diagrams which illustrate the method of checking the operation of a high-to-low side valve and conducting the first pump down of the system, according to the present invention.
Figure 4B:
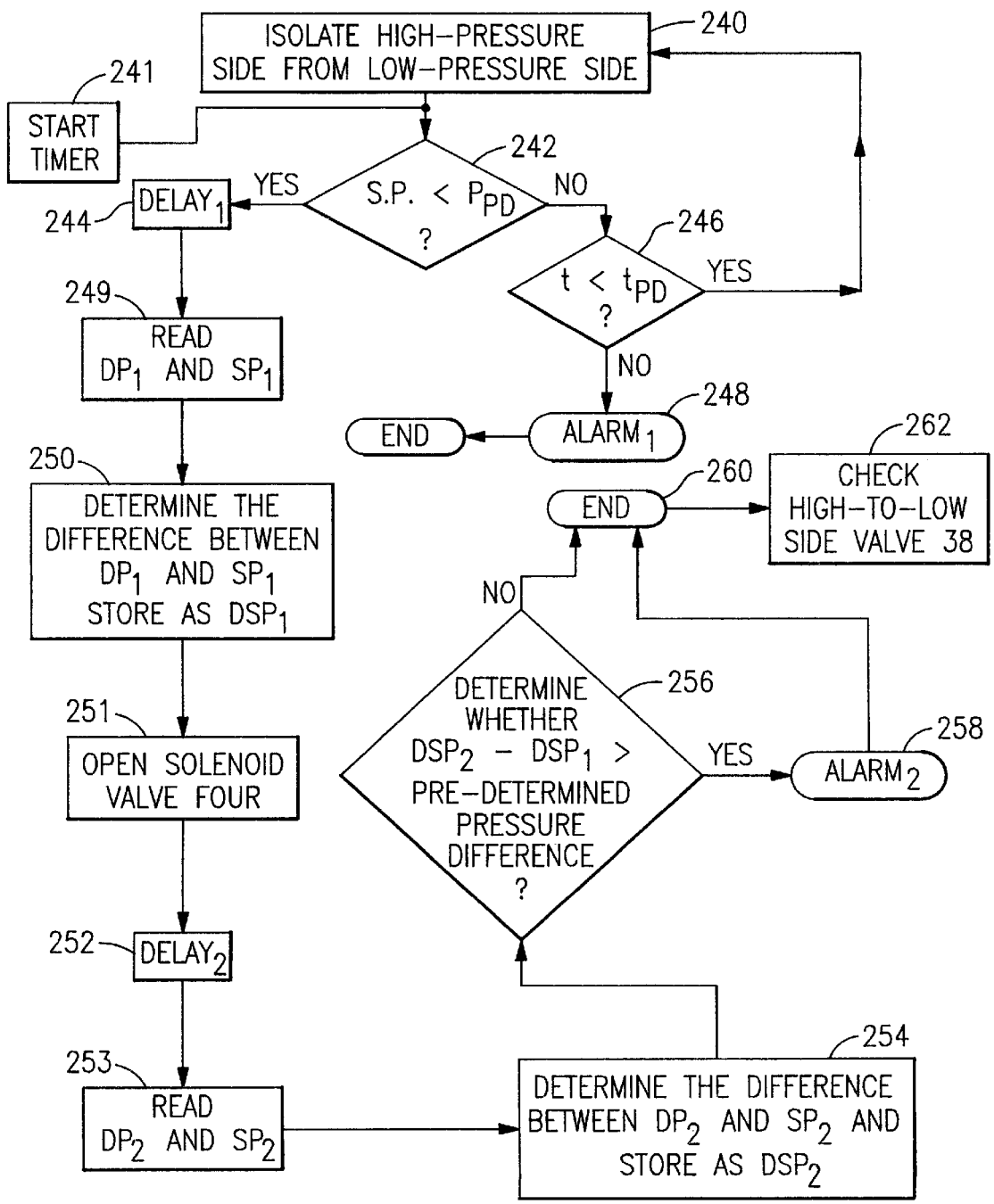

With reference to FIGS. 4(a) and 4(b), the processor 100 determines whether the system 10 can be pumped down 208, and then determines if the closed high-to-low side valve 40 will open and then close again. Importantly, if any high-to-low side valve 34–40 does not open and close properly, hot gas vapor can leak from the high-pressure side to the low-pressure side. This will reduce the ability of the system to cool when the system is operating in a cooling mode, and to heat when operating in a heating mode.

FIG. 4(a) will now be described in greater detail with reference to FIG. 4(b). As indicated in step 240, to begin the test, the system is initially running with all valves 34–40 closed, and the compressor 12 operating at low speed. The processor then starts a timer at step 241. As demonstrated at steps 242 and 246, the timer continues to run until either the suction pressure drops below a predetermined suction pressure (preferably 10 psig) or the timer runs for a predetermined time (preferably 240 seconds). As indicated in step 248, the processor will activate an alarm if the suction pressure does not drop below 10 psig and the timer has run for the predetermined time (i.e., 240 seconds). This alarm means that the system could not be pumped down sufficiently (i.e., the system was unable to drop the suction pressure to the necessary amount). On the other hand, as indicated by the feedback loop connecting step 246 to 240, if the timer has not yet expired, then the processor 100, as indicated at step 242, will continue to determine whether the suction pressure is less than a predetermined suction pressure.

However, if at step 242, the processor determines that the suction pressure can be decreased below a predetermined pressure, then the processor, after a momentary delay 244, reads the discharge pressure and suction pressure at step 249.

Once this occurs, as demonstrated by block 250, the processor determines the difference between the discharge pressure and suction pressure which it stores as DSP1.

As indicated at step 251, the processor 100 then opens high-to-low side valve 40. In theory, the difference between the discharge and suction pressure will drop dramatically if the high-to-low side valve 40 opens when it is commanded to open 251. Thus, a change in the difference between the discharge pressure and suction pressure is examined at step 256 to determine if high-to-low side valve 40 opens properly. As indicated, at steps 252–254, after a short delay, the processor 100 again reads the discharge pressure and suction pressure, calculates the difference between the discharge pressure and the suction pressure, and stores this value as DSP2.

At step 210 and 256, the processor then calculates the difference between DSP2–DSP1, and activates an alarm if this difference is greater than a negative predetermined pressure difference (preferably –20 psig). If so, it is determined that high-to-low side valve 40 is not working properly, and the processor will proceed to check high-to-low side valve 38 if the first pump down has been successfully completed and even if it has been confirmed that valve 40 does not open properly. Once the processor confirms this at step 260, the pretrip proceeds at step 262 to determine if a closed high-to-low side valve 38 can be opened and then closed again after a second pump down is conducted.

When the processor 100 opens (high-to-low side valve 40 at step 251), vapor refrigerant is supplied to the evaporator so that another pump down can be implemented, and to help evaporate any liquid refrigerant remaining in the evaporator after the previous pump down.

Figure 5A:
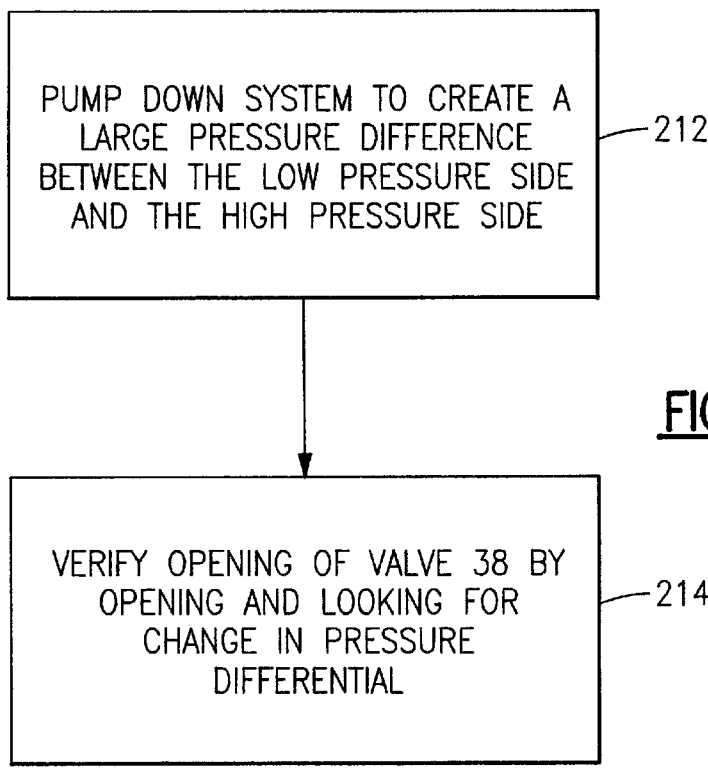
FIGS. 5(a) and 5(b), are functional block diagrams which illustrate the method of checking the operation of a second high-to-low side valve and conducting the second pump down of the system in preparation for the final pump down, according to the present invention.

With reference to FIG. 5(a) the processor 100 determines at step 212 whether the system 10 can be pumped down for a second time, and then determines if the closed high-to-low side valve 38 will open at step 214. Once again, if any high-to-low side valve 36–40 does not open and close properly, hot gas vapor can leak from the high-pressure side (condenser) to the low-pressure side (evaporator). This will reduce the capacity of the system to cool when the system is operating in a cooling mode, and to heat when operating in a heating mode.

Figure 5B:
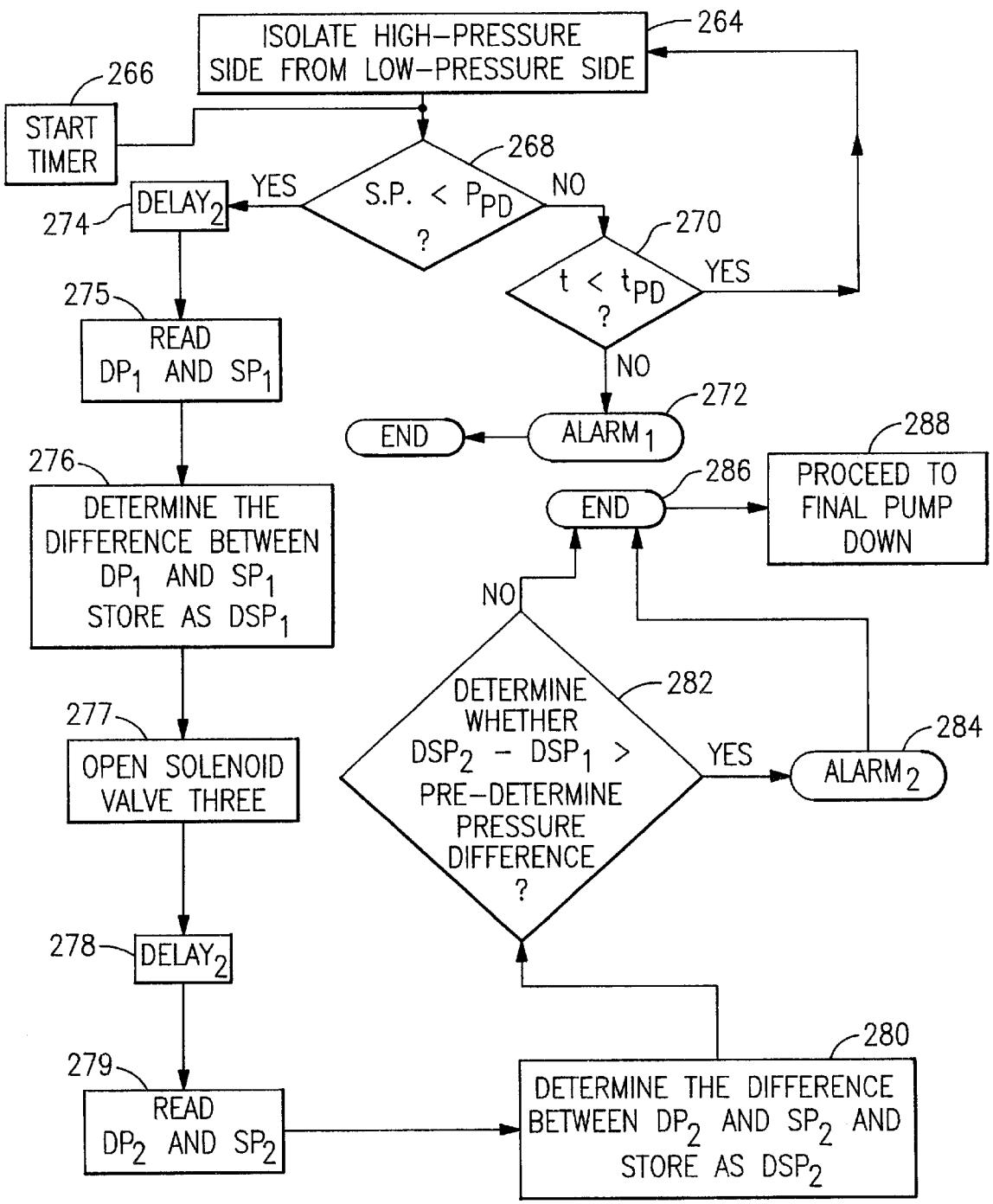

The process described in FIG. 5(a) will now be described in greater detail, reference being made to FIG. 5(b). As indicated in step 264, the system is initially running with all high-to-low side valves 34–40 closed. The processor then starts a timer at step 266. As demonstrated at steps 268 and 270, the timer continues to run until the processor 100 determines that either the suction pressure has dropped below a predetermined suction pressure (preferably 10 psig) or the timer has expired after a predetermined time (preferably 240 seconds). As indicated in step 272, the processor will activate an alarm if the suction pressure does not drop below 10 psig and the timer has run for the predetermined time (i.e., 240 seconds). This alarm means that the system could not be pumped down sufficiently (i.e., the system was unable to drop the suction pressure to the necessary amount). On the other hand, as indicated by the feedback loop connecting step 270 to 264, if the timer has not yet expired, then the processor 100 will continue to determine whether the suction pressure is less than a predetermined suction pressure. Once this occurs, as demonstrated by blocks 274–276, the processor momentarily waits (preferably 2 seconds), read the discharge pressure and the suction pressure between those pressure, and stores the value as DSP1.

As indicated at step 277, the processor 100 then opens high-to-low side valve 38. As mentioned earlier, the difference between the discharge and suction pressures will drop dramatically if the high-to-low side valve 38 opens when it is commanded to open at step 277. Thus, a change in the difference between the discharge pressure and suction pressure is examined at step 282 to determine if high-to-low side valve 38 opens. As indicated at steps 278–280, after a short delay, the processor 100 again reads the discharge pressure and suction pressure, calculates the difference between the discharge pressure and the suction pressure, and stores this value as DSP2.

At step 214 of FIG. 5(a), the processor 100 verifies the opening of high-to-low side valve 38 by opening the valve 38 and monitoring for changes in differential pressure. This process will now be described in detail, reference being made to FIG. 5(b).

At step 282, the processor calculates the difference between DSP2–DSP1. If this difference is greater than a negative predetermined pressure difference (preferably –20 psig) then the processor 100 activates an alarm at step 284. If so, the pretrip fails, but is not aborted, and it is determined that high-to-low side valve 38 is not working properly. The pretrip routine then proceeds to a final pump at step 288 despite a faulty high-to-low side valve 38. By contrast, if at step 282, the processor 100 determines that the difference is less than a predetermined pressure difference, then the pretrip routine merely proceeds to the final pump down at step 288.

This final pump-down is the third and final sub-step of step 200, increasing the pressure difference 200. This "final pump-down" ensures that the system is completely pumped-down before performing the leak test. The final pump-down is necessary for two important reasons. The first is that in order for small leaks to be detected, a significant pressure difference must exist between the high and low-pressure sides. The second reason is that if the pump down is inadequate, some fluid may remain in the evaporator, and upon evaporation will create a drop in suction pressure. This makes it difficult to distinguish whether or not the system is leaking, or if fluid originally present in the system is merely evaporating. Thus, it becomes necessary to check that during the previous pump downs, nearly all fluid was removed from the evaporator. To accomplish this, the final pump-down is performed, which will be described with reference to the flow diagram of FIG. 6.

Figure 6:
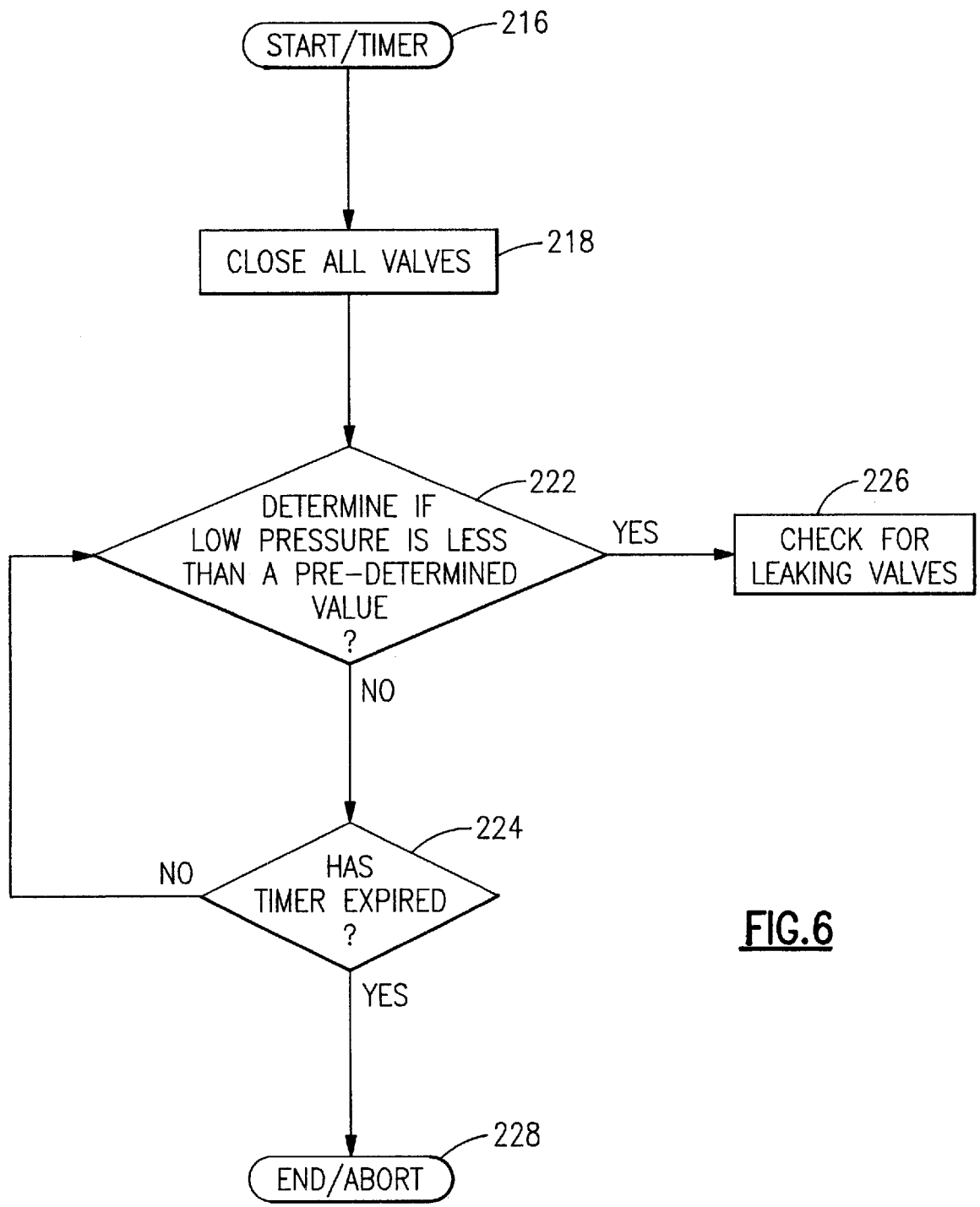
FIG. 6 is a functional block diagram which illustrates the method of determining whether the system can be adequately pumped down.

With reference to FIG. 6, as indicated at step 218–220, the processor 100 first resets the timer, closes all high-to-low side valves 34–40. As demonstrated at step 222, the processor 100 then determines whether the suction (low side) pressure has dropped below a predetermined suction pressure (preferably 5 psig). The processor can accomplish this by reading the suction and determining whether or not the suction pressure is less than a predetermined suction pressure (preferably 5 psig). As indicated at step 228, if the timer expires before the suction pressure drops below 5 psig, then the processor will activate an alarm to signal that the system cannot be properly pumped down to the necessary pressure. As indicated at step 224, if the processor 100 determines that the desired suction pressure has not yet been attained, then processor continues to determine at step 222 if the suction pressure is less than a predetermined value. That is, the system will continuously read the suction pressure and attempt to decrease the suction pressure until the suction pressure is less than the predetermined value. Once this occurs, the system has been successfully pumped down to the target suction pressure of 5 psig. When the system has been successfully pumped down, processor 100 proceeds to step 202 as indicated in FIG. 3. As indicated by step 202, the processor will determine if, leaks are present between the high-to-low side of the system 10. A specific example illustrating how leaks may be tested is described with reference to the flow diagram of FIG. 7.

Figure 7:
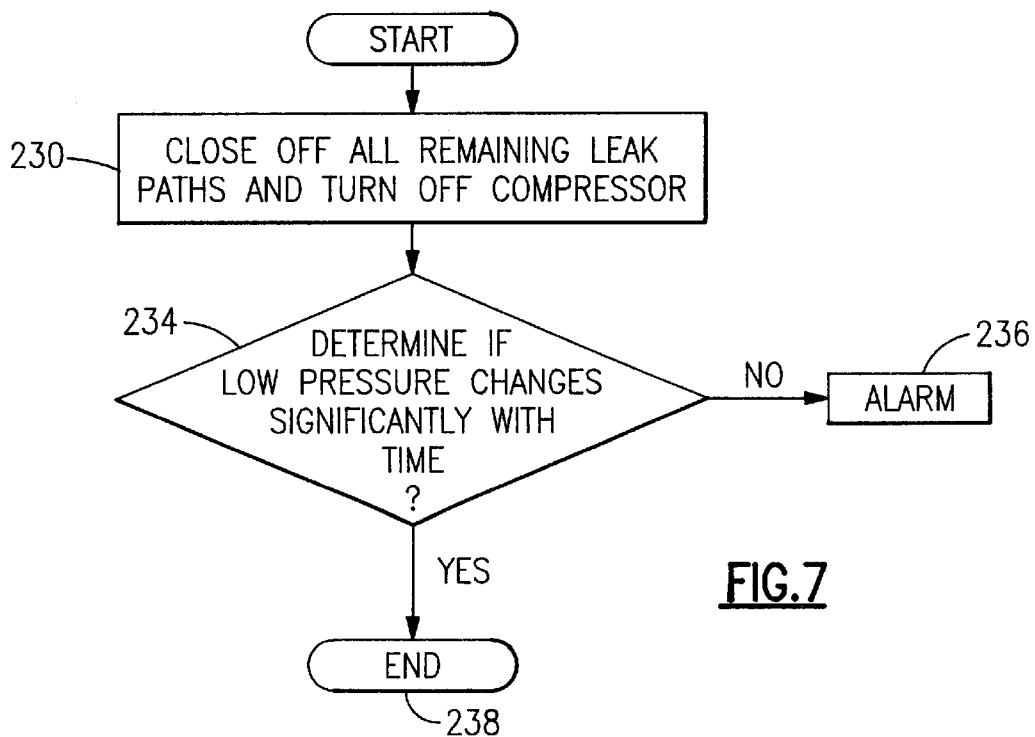
FIG. 7 is a functional block diagram which illustrates the method of determining whether the valves connecting the high pressure side to the low pressure side are leaking.

With reference to FIG. 7, in order to check for leaks between the high-side and low-side, after the third successful pump down, at the processor 100 at step 230 turns off the compressor and simultaneously closes all remaining leak paths (for example: high-to-low side valve 34–40 or the compressor 12 bleed ports). As a result, the "pumped-down" suction pressure will dramatically increase if a leak exists. That is, with the suction pressure at such a low value, the suction pressure will differ significantly when sampled at different times if leaks are present since gas will leak through the valve as the suction pressure attempts to increase to the workspace saturation pressure. To determine if the suction pressure increases at step 234, the processor 100 samples the suction pressure, waits a predetermined time (preferably 60 seconds), samples the suction pressure again, and then determines whether the difference between SP2 and SP1 is greater than a predetermined difference (preferably 25 psig). As indicated at step 234, if the processor 100 determines that the suction pressure difference is greater than the predetermined difference, then it is presumed that the unit has a high-side leak. As a result, the processor 100 will trigger an alarm to alert the user of the leak. However, as indicated at step 238, if the suction pressure is maintained within a specified limit during that time (i.e., less than the predetermined difference), then it is determined that the valves are in proper working condition, and the processor 100 will end test.

The processor 100 may administer the test described herein immediately before or subsequent to administering other tests for testing various other system components, or else processor 100 may administer the present testing method independent of administering other component tests. Related methods for testing other components of refrigeration systems are described in copending application Ser. No. (09/234,041), entitled "Pretrip Device for Testing of a Refrigeration System Compressor", and application Ser. No. (09/234,029), entitled "Method for Automated Detection of Leaks in a Discharge Check Valve", each of which are assigned to the assignee of the present invention, filed concurrently herewith, and incorporated herewith by reference in its entirety. Methods for administering entire pretrip routines for testing of entire refrigeration system are discussed in copending application Ser. No. (09/234,032), entitled "Adaptive Pretrip Selection " and application Ser. No. (09/234,037), entitled "Pretrip Routine Comprising Tests of Individual Refrigeration System Components", each of these applications also assigned to the assignee of the present invention, filed concurrently herewith, and incorporation herewith by reference in its entirety.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:

1. A method of testing for leaks between the high pressure side and low pressure side of a refrigeration system, comprising:

(a) determining whether a high-to-low side valve will open and close properly;

(b) increasing a pressure difference between said high pressure side and said low pressure side; and (c) determining whether any high-to-low side valve has a leak.

2. The method recited in claim 1, wherein step (c) comprises the steps of:

(i) closing all known leak paths;

(ii) turning off a compressor; and (iii) determining whether said low pressure changes over time.

3. The method recited in claim 1, wherein step (a) comprises the steps of:

(i) increasing a pressure difference between the high pressure side and low pressure side of the system;

(ii) reading said pressure difference of said system;

(iii) opening said high-to-low side valve; and (iv) determining if said pressure difference changes with time.

4. The method recited in claim 3, wherein the step (i) comprises:

(i) isolating the high-pressure side from the low-pressure side; and (ii) determining if the low-pressure can be decreased below a pre-determined pressure.

5. The method recited in claim 3, wherein the step (ii) comprises:

(i) reading pressures in said high pressure side and said low pressure side;

(ii) subtracting said pressure reading from said low pressure side from said pressure reading of said high pressure side; and (iii) storing the result as DSP1.

6. The method as recited in claim 5, wherein the step (iv) comprises:

(i) waiting a pre-determined time and reading second pressures from said high and low pressure sides;

(ii) subtracting said second pressure reading from said low pressure side from said second pressure reading from said high pressure side;

(iii) storing the result as DSP2; and (iv) determining whether the difference between DSP2 and DSP1 is greater than a pre-determined pressure difference.

7. The method recited in claim 6, further including the step of:

(v) sounding an alarm to indicate that said valve is not working properly if the difference between DSP2 and DSP1 is greater than a pre-determined pressure difference.

8. The method recited in claim 4, wherein the sub-step (ii) of determining if the low-pressure can be decreased below a pre-determined pressure includes the step of:

allowing a timer to run until a suction pressure drops below a predetermined suction pressure; and waiting momentarily.

9. The method recited in claim 1, wherein step (b) comprises the steps of:

(i) closing all high-to-low side valves;

(ii) reading a pressure difference indicator of said system; and (iii) determining whether said pressure difference indicator is greater than a predetermined value.

10. The method recited in claim 2, wherein sub-step (iii) comprises the steps of:

(i) reading a first pressure value;

(ii) waiting a pre-determined time;

(iii) reading a second pressure value;

(iv) determining whether the difference between said first pressure value and said second pressure value is greater than a predetermined difference; and (v) triggering an alarm to alert the user of the leak if the difference is greater than the predetermined difference.

11. A method for testing a refrigeration system having a high pressure side, a low pressure side, and a first and second high-to-low side valves; said method comprising the steps of:

(a) closing said first and second high-to-low side valves;

(b) decreasing a pressure of said low pressure side and increasing a pressure of said high pressure side;

(c) opening said first high-to-low side valve, and monitoring for changes in pressure in said refrigeration system to verify opening operation of said first high-to-low side valve;

(d) re-closing said first high-to-low side valve;

(e) decreasing a pressure of said low pressure side and increasing a pressure of said high pressure side; and (f) opening said second high-to-low side valve, and monitoring for changes in pressure in said refrigeration system to verify opening operation of said second high-to-low side valve;

(g) re-closing said second high-to-low side valve;

(h) decreasing a pressure of said low pressure side and increasing a pressure of said high pressure side; and (i) determining if leaks are present between said high and low pressure sides by monitoring for changes in pressure in said refrigeration system.

12. The method of claim 11, wherein said decreasing step (h) includes the step of decreasing said pressure of said low pressure sides below a pressure which said low pressure side is decreased to in step (e).

* * * * *